United States Patent

[11] 3,631,740

[72] Inventor James A. Gavagan
 Center Line, Mich.
[21] Appl. No. 57,676
[22] Filed July 23, 1970
[45] Patented Jan. 4, 1971
[73] Assignee American Motors Corporation
 Kenosha, Wis.

[54] LATCH ARRANGEMENT FOR VEHICLE SEAT ADJUSTERS AND THE LIKE
 9 Claims, 5 Drawing Figs.
[52] U.S. Cl. .................................................. 74/527,
 248/430, 296/65, 297/216
[51] Int. Cl. .................................................. G05g 5/06,
 F16m 13/06, B60n 1/08
[50] Field of Search ....................................... 74/527,
 537, 533; 287/58, 58 CT; 248/430, 429, 420, 424;
 296/65; 297/216

[56] References Cited
UNITED STATES PATENTS

| | | | |
|---|---|---|---|
| 3,450,425 | 6/1969 | Leonhardt | 74/533 |
| 3,288,422 | 11/1966 | Krause | 248/429 |
| 3,524,677 | 8/1970 | Louton | 248/430 X |
| 2,798,532 | 7/1957 | Clark | 248/430 |
| 3,460,794 | 8/1969 | Colautti | 248/420 X |

Primary Examiner—William F. O'Dea
Assistant Examiner—Thomas R. Hampshire
Attorney—Barbee & Latta ABSTRACT: An improvement in a latch arrangement particularly adapted in vehicles to seat adjusters or the like to resist unlockment upon impact occurrence. The latch arrangement having a latch member with arm moveable therewith in a guidance arrangement having preformed marginal wall areas adapted, upon being impacted by the arm with a force of predetermined magnitude, to destruct and form a reception area wherein the arm is received in a displacement arrangement securing the latch member from travel from its latched position.

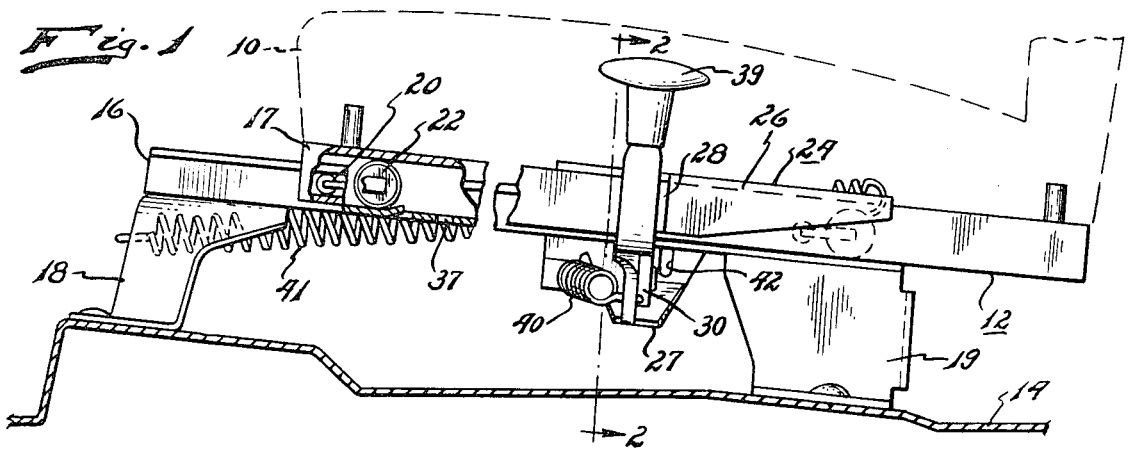
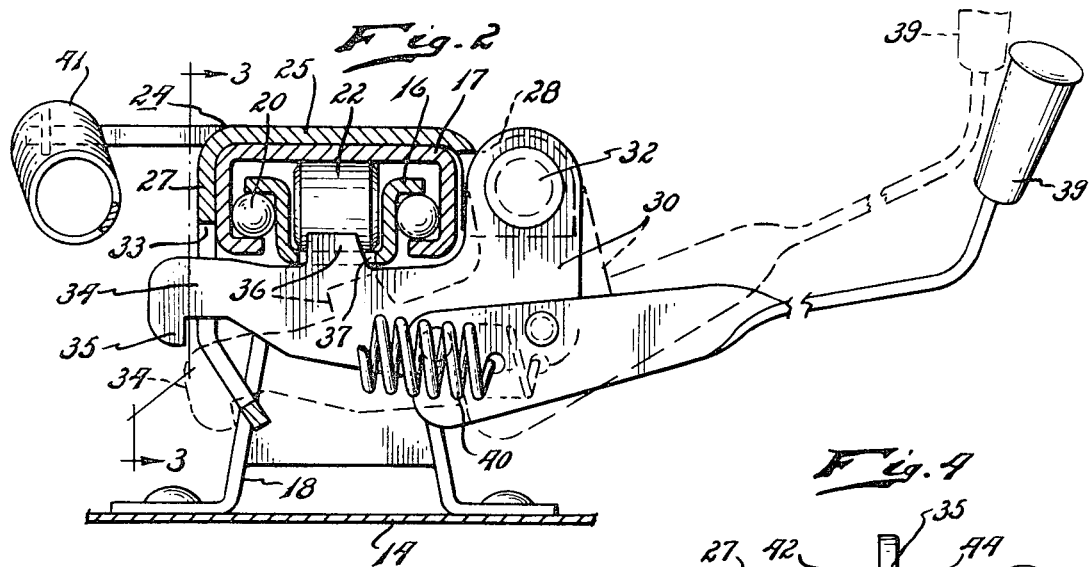
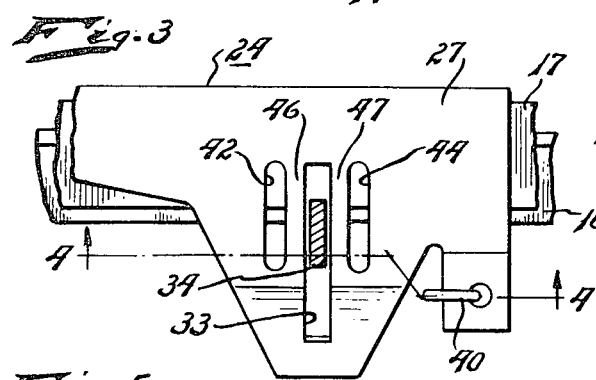
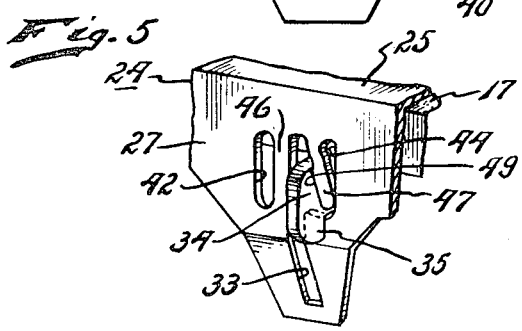
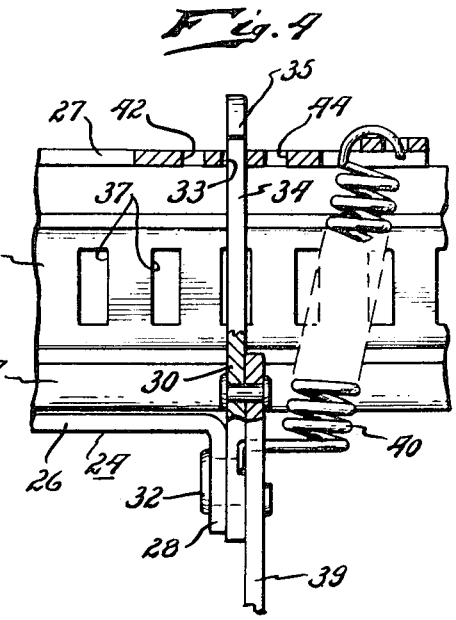
INVENTOR.
JAMES A. GAVAGAN
BY Barber & Latta
ATTORNEYS

LATCH ARRANGEMENT FOR VEHICLE SEAT ADJUSTERS AND THE LIKE

BACKGROUND OF THE INVENTION

1. Field of the Invention

This invention pertains to an automatic self-lockment for a latch arrangement as in a vehicle seat adjuster to prevent unlatchment.

2. Description of the Prior Art

A traveling vehicle coming to a sudden halt, as by collision, brake application or the like, creates a buildup of kinetic energy which in the vehicle seat is transmitted down through the seat adjuster and therethrough to the floor of the vehicle for absorption. When this force or energy is of a predetermined magnitude, it often results in a failure of the latch member in the seat adjuster to maintain its lockment. Upon latch failure the seat is freed to travel in an uncontrolled, unwanted movement often resulting in a runaway with resultant injury to the seat occupant. In general, the seat adjusters are telescoping tracks with the latch member generally being pivotally mounted for carry on one track to engage, disengage keeper notches on the other track. In present structural arrangements a subjecting of the latch member to undue stresses, greater than that occurring during normal operation and use of the seat as from a collision impact, frequently results in the latch member being bodily distorted, warped or angled relative to the keeper notches to become disengaged therefrom by sliding or popping out. Furthermore, present latch arrangements in seat adjusters are ineffective in preventing separation or peeling away of one track from another when total separation of the tracks from each other is had, the seat becomes detached from any securement with the floor of the vehicle. To preserve and continue the interlockment of the latch arrangement during and following the buildup of energy forces, as occurs from sudden stoppage of the vehicle, or a collision impact, that the present invention is directed.

SUMMARY OF THE INVENTION

It is an object of the present invention to provide an improved latching arrangement.

Another object of the present invention is to provide a latching arrangement which is responsive to an impact force in interlocking the latch member to maintain its continuance in lockment during and following the period of absorbing an impact force.

Another object of the present invention is to provide a pivotally mounted latch member in a latching arrangement adapted for use in a vehicle seat adjuster. The latch member having an arm in a guidance arrangement which is prearranged to collapse in a controlled manner, upon being impacted by the arm with a force of predetermined magnitude, to form a reception area lateral to the normal travel movement of the latch member to receive the arm therein in a lockment to insure against pivotal movement of the latch member and preventing unlatchment of the seat adjuster.

Another object of the present invention is the spatial arrangement of slots, or cutout areas, relative to a guidance slot in defining retaining wall areas for the guidance slot adapted to being displaced, upon being impacted, to an adjacent slot area to form a reception area to receive the impact inflicting member in displacement.

Another object of the present invention is the arrangement of a saddle bracket tranversely about three sides of a telescoping track assembly with a latch member about the fourth side moveably secured to one leg of the saddle bracket and arranged to automatically be secured to the other leg of the saddle bracket in a band encirclement to prevent lateral separation of the telescopic tracks.

Another object of the present invention is to provide a latch arrangement having an impact initialed self-lockment which is economical of manufacture and highly efficient in use.

BRIEF DESCRIPTION OF THE DRAWING

FIG. 1 is a fragmentary side view of a seat mounted in a vehicle body on a conventional seat adjuster, with parts broken away and parts shown in section, incorporating my improved latch arrangement.

FIG. 2 is a sectional view taken substantially along line 2—2 of FIG. 1.

FIG. 3 is a fragmentary section view taken substantially along line 3—3 of FIG. 2.

FIG. 4 is a sectional view taken along line 4—4 of FIG. 3, and

FIG. 5 is a fragmentary view in perspective illustrating a section of the latch member in displacement in a controlled ruptured area and in lockment therewith.

DESCRIPTION OF THE PREFERRED EMBODIMENT

To best illustrate and describe the present invention, it is here shown and described as embodied in a latching arrangement in a vehicle seat adjuster though it will be readily apparent and obvious of being applicable to like latch arrangements employed in other areas of a vehicle, as the latching of a hood or the like.

With reference to the drawing, a seat 10 is shown secured for carry on a seat adjuster assembly, designed in general by the numeral 12, which is secured to a floor 14 of a passenger compartment of a vehicle.

The seat adjuster assembly 12 includes telescoping channel members or tracks 16, 17. The track 16 is fixedly secured by a front bracket 18 and rear bracket 19 to the floor 14. The channel member or track 17 is slidably supported and guided on the stationary track 16, a frictionless guide being provided by suitable balls 20 rollers 22 arranged in a conventional manner therebetween. The seat 10 is secured to for carry by the track 17.

An inverted U-shaped bracket 24 straddles the tracks 16, 17 and is secured by its bight section 25, by weld rivets or the like, to the top surface of the upper track 17 for carry thereby. Legs 26, 27 of the bracket 24 extend downwardly along adjacent sides of the track. The leg 26 is bent outwardly at right angles to the adjacent side of the track forming an ear 28 to which is pivotally secured by pin 32 a latch member 30. The leg 27 extends downwardly to terminate a predeterminate distance below the tracks and has a vertical extending aperture or guide slot 33 for receiving therein an arm 34 extending from the latch member 30. The arm 34 extends through the guide slot 33 to terminate thereyond in a hook arrangement 35. The leg 27 is bent to provide guidance for the arcuate travel of the arm 34 as carried by the latch member in moving between latch and unlatch position.

A series of keeper notches 37 are formed longitudinally along the underside of the stationary track 16 to be selectively engaged by a finger 36 formed on the latch member 30 and secure thereby the tracks against movement relative to each.

The latch member 30, provided with a handle 39, is pivoted manually to disengage the latch finger 36 from and hold it out of engagement from the keeper notches as the seat is longitudinally adjusted and repositioned along the track 16. A tension spring 40 having one end secured to the latch member 30 and the other end to the leg 27, biases the latch member 30 to urge and hold the latch finger 36 in engagement with a selected keeper notch to lock the seat in its adjusted position.

A tension spring 41, one end being secured to the track 17 and the other end to the front bracket 18, biases the track to assist travel of the track 17 in one direction.

Slots 42, 44, formed in the leg 27, are arranged on opposite sides of the guide slot 33, preferably in spaced parallel relation therewith, and forms therebetween retaining walls 46, 47. The retaining walls 46, 47 form the sides of the guide slot 33 for a segment of its linear length for travel guidance of the latch arm 34 and particularly in the travel area the arm 34 is normally held at rest by the latch member 30 in its latched position. The linear length of the retaining walls 46, 47 and correspondingly the length of the slots 42, 44 correspond to the opposed dimensions of the arm extending longitudinally in the guide slot. Referring to FIGS. 3 and 5, the slots 42, 44 define and extend the retaining walls 46, 47 from slightly below the lower edge of the arm to terminate a spatial distance beyond the top edge of the arm preferably terminating in height with the guide slot 33.

The guide slot 33 provides normal travel guidance for the pivoted movement of the latch member and, including the area formed by the retaining walls 46, 47, will resist side or lateral impact from the guided arm 34 as occurs during normal use of the seat as well as in adjusting the seat.

In the event the seat and seat adjuster assembly become subjected to kinetic energy of a predetermined magnitude, or greater, the force transmitted to the latch arrangement, in latched position will cause the arm 34 of the latch member to be abutted against a retaining wall in the path of the force. The impacted wall, illustrated in FIG. 5 as being wall 47, is partially severed from the body of the bracket leg 27 and driven into displacement into the adjacent slot area 44. The severance will be in the area of direct contact engagement, here severing the wall at its lower connection with the body of the bracket leg while the upper end remains connected to yield in a bending action in a conformity to effect the displacement. The arm 34 is carried by the impact movement into the area vacated by the wall 47 to be received in displacement from the guide area or slot 33. As the area vacated, or pocket 49, is lateral to the travel guidance area of the arm, the latch member 30 is not disturbed from its latched position. Further, as the pocket 49 is dimensionally restricted to receiving the arm, the displacement of the arm therein prevents normal travel movement and precludes the latch member 30 from pivotal movement.

With the displacement of the arm 34 into the pocket 49, the hook arrangement 35 is also carried into a displacement to engage against a marginal edge about the pocket 49. The engagement of the hook 35 with the leg 27 prevents the latch arm from withdrawal through the leg.

The present arrangement is also effective in maintaining the latch member in its lockment position even though the impact loading or force is of such magnitude to result in the latch finger 36 being carried by the upper track 17 with such force to shear or tear out one or more keeper notches. As the latch member is being held in lockment position, by the displacement and lockment of the arm 34, described above, the latch finger will be in position, upon termination of the shearing action, to reengage and relatch the track at the end of the torn out section and the runaway movement of the seat is halted and held to a minimum of travel.

The constructive arrangement and placement of the latch member 30 in securement transversely across the underside of the lower track with the U-shaped bracket 24 forms an encircling structure transversely about the track assembly. In the lockment of the latch member, by the arm 34 interlocking with the leg 27, the tracks become banded together, preventing separation or peeling apart and insuring securement of the seat with the floor of the vehicle.

Though the present arrangement illustrates and describes the retaining walls as being integrally formed in the body of the leg 27, it will be readily apparent that it may, if desired, be an insert secured in any suitable matter to the leg.

Having thus described the invention, it will be apparent to those skilled in the art that various modifications and changes can be made without departing from the spirit of the invention or the scope of the appended claims.

I claim:

1. An improvement in a latch arrangement having an operative latch member normally being held in latch position comprising;
   guide means associated with said latch arrangement comprising spaced apart parallel walls forming a guidance travel area;
   said latch member having an extension received in said guidance area for travel therein;
   means prearranging a linear section of a marginal portion along said guidance area to being displaced therefrom upon said section receiving an impact having a predetermined force and reconstruct the said marginal portion into a reception area to receive the impact inflicting extension in a lockment therein and secure thereby said latch member in latch position.

2. The improvement in claim 1;
   said reception area being formed to receive said extension from its position held with said latch member in latched position, said extension moving laterally relative to its normal travel to preclude travel in said guidance area.

3. In a vehicle seat adjuster assembly having a pair of telescopic tracks, latch means including a latch member being normally held securing said tracks from movement relative to each other and being manually operative to release said tracks from securement to each other, and means for the lockment of said latch member in its normally held position in response to occurrence of kinetic energy disturbance thereagainst comprising;
   an arm integral with and in movement with said latch member;
   guide means having a guide area receiving and guiding the travel of said arm;
   means structurally arranging at least one linear section of the marginal edge section along said guidance area to being structurally altered to form a reception area in lateral communication with said guidance area upon said linear section being impacted by said arm upon conduction of said disturbance thereto, and said reception area receiving said arm in displacement from said guidance area.

4. In a vehicle seat adjuster assembly of claim 3;
   said arm extending through said guidance area and having a hook arrangement adjacent its terminated end, said hook arrangement being adapted for engagement with said guide means to prevent withdrawal of said arm from said guide area.

5. An improvement in a latch arrangement in a vehicle seat adjuster assembly having a pair of telescopic tracks, said latching arrangement having a latch member manually operative and means normally holding said latch member to secure said tracks from movement relative to each other comprising:
   bracket means secured to one of said tracks and means pivotally securing said latch member to said bracket means;
   an arm carried in movement by said latch member;
   a guide slot formed in said bracket means receiving and guiding the travel of said arm as carried in movement by said latch member;
   slots formed in said bracket means extending along opposed sides of said guide slot in spaced longitudinal relation therewith for a sectional length of said guide slot and forming therebetween retaining walls defining a portional length of said guide slot adapted, upon being selectively impacted by said arm with a predetermined force, into being moved into displacement into the slot adjacent thereto, and said arm being received in displacement in the area vacated by the displacement of said retaining wall.

6. The improvement in claim 5;
   said slots being arranged opposed to a longitudinal area of said guide slot occupied by said arm being held by said latch member being held by said means.

7. The improvement in claim 6;
   said slots being restricted in its longitudinal length with said guide slot to restrict the forming of said reception area to receiving said arm in a movement lateral to its direction of travel and precluding travel of such arm in said guide slot.

8. The improvement in claim 5;
   said bracket means having spaced apart leg section embracing opposed sides of said track assembly, means securing said bracket means to one of the said tracks having at least one leg thereof extending and terminating beyond said other track and said leg having formed therein said slots and guide slot, said latch member extended between said legs in close proximity to said other track having said arm received in said slot; and means pivotally securing said latch member to said other leg.

9. The improvement on claim 8;

keeper notches formed in said other track for engagement by said latch member arranged intermediate the pivotal securement and the guidance of said latch member.

UNITED STATES PATENT OFFICE
CERTIFICATE OF CORRECTION

Patent No. 3,631,740          Dated January 4, 1972

Inventor(s) JAMES A. GAVAGAN

It is certified that error appears in the above-identified patent and that said Letters Patent are hereby corrected as shown below:

Data element identifier /45/ change "Jan. 4, 1971" to --Jan. 4, 1972--.
Data element identifier /73/ after "Wis." add --a one-half part --.

Signed and sealed this 8th day of August 1972.

(SEAL)
Attest:

EDWARD M. FLETCHER, JR.          ROBERT GOTTSCHALK
Attesting Officer                  Commissioner of Patents